April 2, 1957     C. R. SMITH     2,787,569

FRICTION MATERIAL

Filed Nov. 15, 1952

INVENTOR
CLOYD R. SMITH

ATTORNEY

United States Patent Office 2,787,569
Patented Apr. 2, 1957

2,787,569
FRICTION MATERIAL

Cloyd R. Smith, Lancaster, Pa., assignor to Armstrong Cork Company, Lancaster, Pa., a corporation of Pennsylvania Application November 15, 1952, Serial No. 320,647

2 Claims. (Cl. 154—43)

This invention relates to a friction material, and more particularly to a friction material suitable for adhesion to metal plates and bands of clutches, brakes, and transmissions.

In the past, the friction plates for oil bath type transmissions, etc., were either made of metals such as sintered bronze, or asbestos, cork composition, and combinations of cork and synthetic rubber. In using materials of this kind, under the application of a suitable engaging load a uniform contact is not always obtained.

It has been found that the frictional characteristics can be greatly improved by the use of a resilient layer of backing material in conjunction with the friction material.

In order to produce a friction facing material for clutches and the like, I have developed a laminated material having a resilient backing layer of cork composition and a friction surface layer composed of granulated cork dispersed in an oil-resistant synthetic rubber matrix. Because of the resilience of the cork composition backing layer and the lateral movement of the cork particles in a synthetic rubber facing layer, a more uniform surface contact is obtained.

An object of this invention is to provide a clutch material which has a uniform engaging surface and a higher coefficient of friction.

Another object of this invention is to provide a clutch material which will result in the smoother application of power from the power source to the driving unit.

Figure 1:
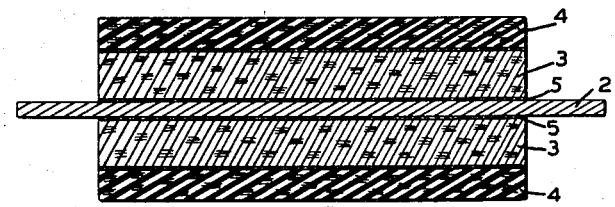
Figure 2:
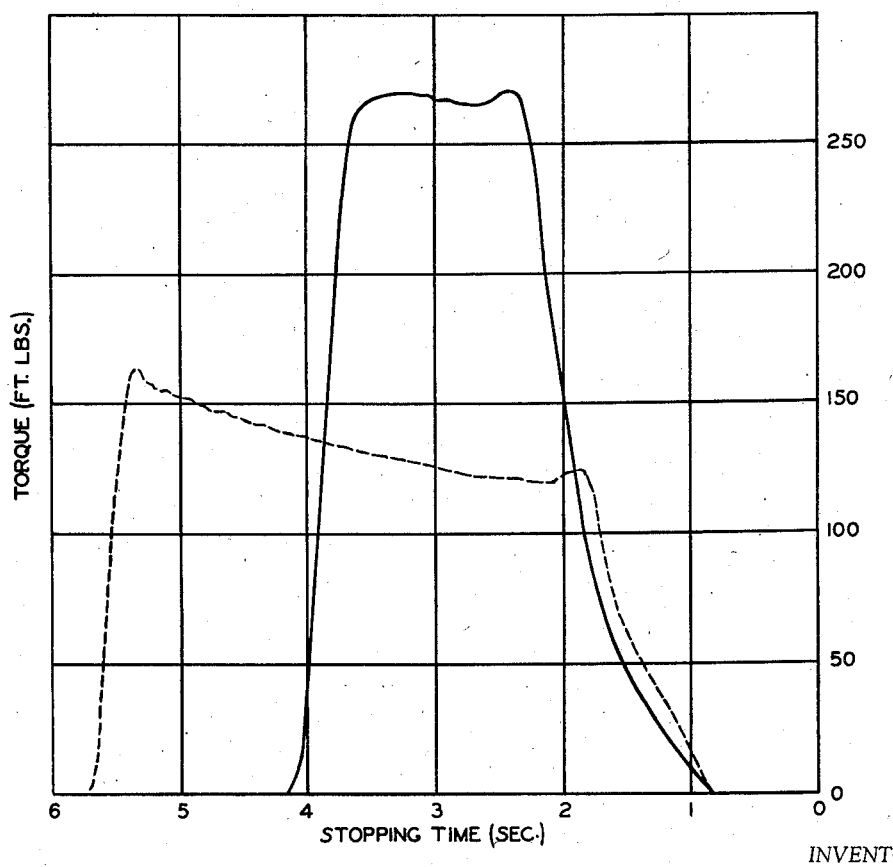

Other obvious objects and advantages of this invention will be apparent upon reference to the attached drawing, in which:

Figure 1 is a cross-sectional view of a clutch plate showing the laminated material adhesively secured to each side thereof; and Figure 2 shows comparative graphs of the prior art material and the material of the present invention.

In Figure 1 of the drawing, the numeral 2 designates a metal plate of the conventional type used in clutches or transmissions. To this plate is secured a layer of cork composition by means of a suitable adhesive 5 which will not be deleteriously affected by oil and heat. A layer of cork composition designated by the numeral 3 is secured to both sides of the plate. To this layer of cork composition a layer composed of granulated cork dispersed in an oil-resistant synthetic rubber matrix is secured, using an oil and heat-resistant adhesive. This assembly is then placed in a press or other suitable clamping device to hold the various elements in proper relationship until the adhesive has set. The synthetic rubber facing material is designated by the numeral 4.

The above method of assembling the clutch disc is merely an example of one method. It will be understood that the material may be made in laminated sheets with the layer of cork composition adhesively secured to the layer of cork and synthetic rubber facing material. These layers are adhesively secured together, and after the adhesive has properly set, elements of the desired size and shape are cut therefrom and secured to the metal plates or bands as desired. The manufacture of this laminated sheet material may also be accomplished by producing a sheet of the cork and uncured synthetic rubber composition and placing on the back of this sheet the loose cork composition mix with the binder applied thereto. This continuous uncured rubber sheet with the cork composition mix applied loosely thereto is then passed through a suitable forming and curing device such as the well-known continuous vulcanizing machine forming a continuous laminated sheet in which the two layers are secured together at their zones of juncture by the vulcanization of the rubber.

In carrying out the invention, the friction surface material should preferably be a material which can flow laterally to a certain extent to eliminate any high spots which may be present on the face of the material. This lateral flow assures a more uniform surface for engagement.

One example of a material which has been found highly desirable for this friction facing material has the following formulation:

Table A

| | Parts by weight |
|---|---|
| Hycar OR-25 (butadiene-acrylonitrile) | 100.00 |
| Sulphur | 1.46 |
| Altax | 1.46 |
| Diphenylguanidine | .21 |
| Zinc oxide | 5.00 |
| Stearic acid | 1.25 |
| P-25 Cumar | 15.00 |
| Dipolymer oil | 15.00 |
| Suprex clay | 80.00 |
| 20-30 granulated cork | 149.00 |

The friction surface produced by this formulation is comprised of cork particles surrounded by oil-resistant synthetic rubber. The synthetic rubber matrix, while it holds the cork particles in place, permits a limited amount of lateral movement of the cork particles to level off any high spots which may be present on the face of the material or which may occur on the face of the material during usage.

In the above formulation, the butadiene-acrylonitrile synthetic rubber serves as the binder for the cork particles and is incorporated in sufficient quantity to form a matrix in which the cork particles are dispersed. The sulphur serves as a vulcanizing agent, while the diphenylguanidine and Altax are accelerators. The zinc oxide and stearic acid are activators for the vulcanization process. The Cumar and dipolymer oil are plasticizers for the synthetic rubber, and the clay is a filler material.

By way of example, a suitable cork composition backing material for the combination comprises the following formulation:

Table B

| | Parts by weight |
|---|---|
| 20-40 mesh cork | 90 |
| 40-55 mesh cork | 10 |
| Binder | 23.4 |

The binder may be any of the conventional cork composition binders which will adhere the cork particles to one another and will not be deleteriously affected by oil or temperatures in the range of those encountered in automatic transmissions. Phenolic resin binders have been utilized with a great deal of success.

Another suitable backing material has been made using the following formulation:

Table C

| | Parts by weight |
|---|---|
| 5–10 mesh cork | 100 |
| Binder | 20 |
| Para-toluene sulphonic acid | 6 |

The purpose of the para-toluene sulphonic acid is to decrease the time required to set the resin in the binder.

An example of a suitable adhesive for adhering the two laminae together and also to adhere the backing to the metal plates is as follows:

Table D

| | Percent by weight |
|---|---|
| Bakelite XYSG resin (vinyl butyral) | 7.69 |
| Denatured ethyl alcohol | 69.25 |
| Bakelite BR–16679 resin (phenolic) | 23.06 |

The above adhesive has been selected because of its suitability for adhesion to metal and the desired composition and its resistance to oil. Due to the fact that the adhesive is of a thermosetting type, it is not affected by the temperatures encountered in clutches, etc. Any other thermosetting adhesive which is resistant to oil and will satisfactorily bond to the metal may be used. While this same adhesive may be used for bonding the two laminae together, it will also be understood that any adhesive which is resistant to oil and will withstand the heat encountered in clutches and transmissions may be used.

Figure 2 shows a graph comparing the material of the invention with a typical conventional material used as a friction facing material. In this graph the abscissae shows the time in seconds required to stop a clutch plate in a testing machine while the ordinates show the torque developed while stopping the test disc. In Figure 2, the dotted line shows the graph for the facing material alone, while the solid line plots the graph for the laminated material of this invention.

In performing this test, the test clutch plate to which the material to be tested has been bonded is placed on a spline shaft between two steel surfaces (one of which acts as a piston) of a clutch assembly which is completely submerged in a test tank filled with oil.

A Vickers hydraulic drive, powered by a 10 H. P. motor, starts and accelerates a 238 pound flywheel to a preselected speed of 1000 R. P. M. When this speed is reached, the driving force is stopped and the plate is revolving freely between the two steel surfaces. The top surface, which operates as a piston, is activated by oil pressure and forces the test clutch plate down against the bottom surface. The torque developed by this test clutch plate in stopping the rotation of the flywheel is measured by electrical resistance strain gauges mounted on a torque arm attached to the clutch mechanism. The strain gauges are connected through suitable electric circuits to a recording potentiometer where a curve of the torque developed is drawn on a strip chart which moves at the rate of one unit per second. This plots a curve of torque v. time.

Upon reference to Figure 2, it will be obvious that with the facing material alone, the time required to stop the unit was 4½ seconds and the maximum torque developed was 167 foot pounds; while in the material of this invention, designated by the solid line on the graph, the time required to stop the test disc was 2.6 seconds and the maximum torque developed was 273 foot pounds. It will also be observed by studying the curve that at the top of the curve the pressure was applied more uniformly in the test material than in the prior art material. The friction facing material was exactly the same in both instances and was the material made in accordance with the example recited in the specification. The thickness of the cork and synthetic rubber friction material in the prior art method was approximately .053"; and in the material covered by this invention, the thickness of the friction face material was substantially the same but was backed by a layer of cork composition made in accordance with the example recited herein and having a thickness of approximately .055". The normal force applied to the facing material while stopping the test disc and flywheel was 45 pounds per square inch and the area of the test disc was 34.8 square inches.

While the foregoing disclosure is directed to disc type friction material, it will be understood that the invention is also suitable in the manufacture of bands of friction material.

It will be obvious from the foregoing that I have developed a friction material which is easy to manufacture and which gives improved performance in comparison to other known materials.

I claim:

1. A friction element comprising a metallic disc, a laminated sheet of material adhesively secured to said metallic disc with the lamellar plane of the sheet being parallel to the plane of the metallic disc, one lamina of which comprises a matrix of butadiene-acrylonitrile synthetic rubber having dispersed uniformly therethrough particles of granulated cork, and a second lamina of cork composition, said cork composition lamina serving as a backing and the butadiene-acrylonitrile synthetic rubber lamina serving as the friction surface.

2. A friction element comprising a metallic backing disc and a laminated sheet of material adhesively secured to said metallic backing disc with the lamellar plane of the sheet being parallel to the surface of the disc, one lamina of which comprises a matrix of butadiene-acrylonitrile synthetic rubber having dispersed uniformly therethrough particles of granulated cork and a second lamina of cork composition, said laminae being adhesively secured together, in such manner that the lamina of cork composition is in engagement with the metallic backing member and the butadiene-acrylonitrile synthetic rubber is the friction-engaging element.

References Cited in the file of this patent

UNITED STATES PATENTS

| 1,591,897 | Vincke | July 6, 1926 |
| 1,873,578 | Grupe | Aug. 23, 1932 |
| 2,398,890 | Howard | Apr. 23, 1946 |
| 2,430,053 | Hershberger | Nov. 4, 1947 |
| 2,560,420 | Dodge | July 10, 1951 |
| 2,607,747 | Billmeyer | Aug. 19, 1952 |

FOREIGN PATENTS

| 654,647 | Great Britain | June 27, 1951 |